3,014,026
CHELATES OF MONOSACCHARIDE-AMINO ACIDS AND RELATED COMPOUNDS

Harry Kroll, 408 Fair St., Warwick, R.I., and Richard S. Gubner, Middle Neck Road, Sands Point, N.Y.
No Drawing. Filed Sept. 5, 1958, Ser. No. 759,157
23 Claims. (Cl. 260—211)

This invention relates to novel compounds of metals such as iron, calcium and bismuth with the products of reaction between amino acids and monosaccharides or related compounds having aldehyde groups such as uronic acids, said compounds being suitable for oral and parenteral administration and for other uses which will be set forth below.

As is well known, the maintenance of normal iron metabolism in mammals, particularly in humans, is a complex process involving many variables. The normal diet contains iron in such quantities that, taken with the absorption of the metal from the intestine, results in iron assimilation barely sufficient to meet the body requirements which are in the region of 0.6–1.2 mg. per day. In addition there are various malfunctions which interfere with the absorption of iron and the utilization of assimilated iron, and it is not surprising therefore that iron deficiency frequently occurs. Actually there is great diminution of the body iron stores before the peripheral red blood cells and the hemoglobin level reveal any striking change, and various abnormalities occur before anemia becomes manifest. Thus the iron-containing tissue respiratory enzymes cytochrome and catalase decrease before anemia becomes notable, and degenerative changes, for example in the gastrointestinal mucosa, leading to achlorhydria may develop prior to and in the absence of anemia as a consequence of iron deficiency.

Conventional therapeutic practice for correcting iron deficiency has been the oral administration of ferrous iron in daily doses of 50–100 mg. of metal. Such oral administration is often poorly tolerated with development of nausea, cramps and diarrhea. Oral iron is inadequate for correction of iron deficiency in several conditions, e.g., infancy, pregnancy, gastrointestinal disease and resection, and in severe iron deficiency where rapid restoration of iron stores is needed. This has resulted in the formulation of compositions for parenteral iron which can be administered either intravenously or intramuscularly, or both.

The intravenous administration of 5 to 10 mg. of iron salts to human subjects is sufficient in most cases to provoke toxic symptoms, especially when the iron is injected rapidly. The toxic reaction is caused by the increase of the iron ion activity in the plasma, which normally is very low. The tolerance to injected iron depends on the iron-free protein, transferrin in the blood which sequesters the ferric ions in the form of a complex, in which the metal ion no longer exhibits its usual chemical properties. Thus patients with small amounts of iron-free transferrin in plasma are intolerant to a few milligrams of iron whereas patients with high amounts of iron-free transferrin can tolerate about 20 milligrams. Intramuscular administration of ferric iron results in a deposition at the site of injection due to the formation of insoluble products.

The parenteral iron preparations which have hitherto been used clinically are of two types: (1) colloidal iron preparations containing hydrated iron oxide solubilized by a carbohydrate, (Imferon, Feojectin), and (2) organic ferric complexes.

Colloidal iron preparations, such as saccharated ferric oxide and dextran ferric oxide have been used with some effect in the treatment of iron deficiency anemia, but these products have shortcomings which are frequently manifested by toxic reactions. The solubilized iron oxide is in a relatively unstable form, and changes in acidity, alkalinity, and electrolyte concentration may precipitate the iron in an insoluble form which may make the metal unavailable for hemoglobin synthesis. The tendency of these colloidal iron preparations to precipitate precludes safe intravenous use. Moreover, prolonged parenteral administration of saccharated iron for treating severe iron deficiency anemias frequently results in accumulations of iron deposits in the liver and spleen due to the inability of the hemoglobin synthesizing system to utilize the injected iron beyond needs and the inability of such parenterally administered iron to be excreted. As a result, the administration of saccharated iron may cause an accumulation of undesirable and unavailable iron which may lead to hemosiderosis.

Several forms of complexed ferric iron preparations have had some clinical use. Thus solutions of iron cacodylate and sodium bis-($\alpha,\gamma$-dioxy-$\beta,\beta$-dimethylbutyrato)-ferrate have been used, but the tolerated doses of these substances are inadequate for general clinical use.

An approach to overcome some of the objections of parenteral iron therapy is the use of an iron preparation which is non-toxic, stable, and physiologically utilizable. It is also desirable that after the body iron depots have been saturated by the administered iron preparation, the excess of iron not immediately required for hemoglobin synthesis be excreted in the urine so that no cumulative iron deposition can occur.

Although attempts have been made to employ iron chelates in the treatment of iron deficient anemias, these have not proven to be effective. For example, the intravenous injection of the sodium salt of the ferric chelate of ethylenediamine tetraacetic acid is ineffective in increasing the hemoglobin of rats on an iron deficient diet (Table 3). Clinical studies have shown that the oral administration of this iron chelate is no better than ferrous sulfate in human subjects. The reason is probably that EDTA binds ferric iron too avidly for the metal to be utilized physiologically.

An object of this invention is to provide novel chelates which, in the form of the respective iron compounds can be administered parenterally or orally with none of the disadvantages of prior compounds and which present the iron in a form which is readily absorbed and utilized physiologically but which is nevertheless sufficiently tightly bound so that excess iron is excreted from the system in the urine rather than accumulated. Moreover, when the iron chelate of our invention administered in doses far exceeding the maximum tolerance hitherto associated with parenterally administered iron the usual toxic manifestations are not found. The novel iron chelates of this invention also have utility in correcting the form of iron deficiency known as iron chlorosis in avocados and other vegetables and fruit. Here too the ferric chelate of ethylenediamine tetraacetic acid has been used as a foliar spray, but it is not particularly effective and results in burning if applied in too great a quantity.

Another object of this invention is to provide bismuth chelates which may be administered orally or intravenously to provide a contrast agent for X-ray examination. In still another embodiment of this invention calcium chelates having a nutritional function are provided for oral administration.

The chelates of the present invention are formed by the reaction of appropriate metal salts, as described in greater detail below, with monosaccharide-amino acids which result from the reaction between a monosaccharide and an amino acid, or with the analogous compounds resulting from the reaction between an uronic acid and an amino acid. These chelates are sufficiently stable to resist hydrolysis in the pH range of 5 to 9.

The monosaccharide-amino acid compounds which are used in preparing the chelates of this invention are prepared by reacting the respective sugars with amino acids. Thus, when glucose is reacted with glycine in a solution of which the pH is adjusted to between 7.5 and 8.5 by the addition of sodium bicarbonate or an equivalent buffering agent, a glucosyl glycinate is produced. The exact reaction mechanism and structure of the product being uncertain, but probably represented by the following chemical sequence:

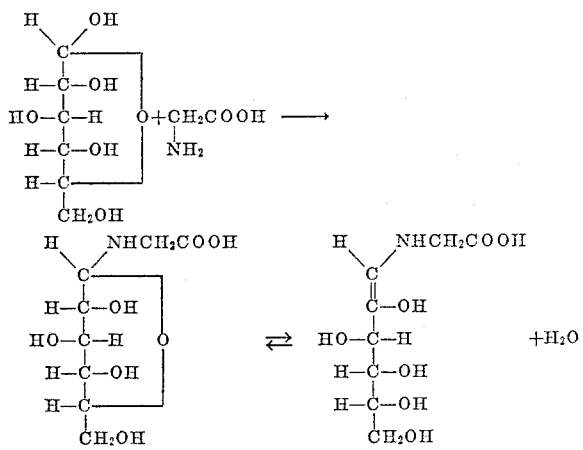

Similar reactions occur between other hexoses, pentoses and uronic acids and glycine and other amino acids.

When the solution of a metal salt is added to a solution of the monosaccharide-amino acid product a chelate is formed. This can readily be observed for example when ferric chloride is added to a solution of a hexose-amino acid product by the formation of a deep red color which is usually indicative of ferric complex formation involving the binding of the ferric ion to an enolic oxygen. Furthermore, we have observed that raising the pH of the resulting solution as high as 10 did not precipitate ferric hydroxide even after standing 24 hours at room temperature.

In this connection, it is noticeable that neither the monosaccharides nor the naturally occurring amino acids will by themselves chelate ferric iron.

While any of the monosaccharides or uronic acids can be used in producing the chelating agents of this invention, we prefer to use glucose, or glucuronic acid or salts or lactones thereof. Among the compounds that we may use are mannose, galactose, fructose, arabinose and xylose and other compounds containing the α-hydroxy carboxyl or α-keto carboxyl moiety, such as acetol, 2 hydroxycyclohexanol, oxaloacetic acid and the like. Some of the amino acids we have used include:

| | |
|---|---|
| Glycine | Ethylene diamine bis-orthohydroxy-phenylacetic acid |
| Sarcosine | Methionine |
| Alanine | Arginine |
| Phenyl alanine | Histidine |
| Glutamic acid | N-hydroxyethyl glycine |
| Aspartic acid | N,N'-ethylenediamine diacetic acid |
| Lysine | N-hydroxyethyl, N,N'-ethylenediamine diacetic acid |
| | B-alanine |

Some of the iron complexes made in accordance with this invention are described in the following examples:

(1) *Ferric complex of sodium glucose glycinate.*—Sodium bicarbonate, 9.0 gms. was dissolved in 100 ml. of water, and to this solution was added 7.5 gms. of glycine. Glucose, 18.0 gms., was added to this mixture which was agitated until a clear solution was obtained. The pH of the solution was between 7.5 and 8.5.

The aqueous solution was concentrated to dryness in vacuo, 1–10 mm. Hg, at a water bath temperature not exceeding 35–40° C. The resulting residue was an amorphous, white granular solid, readily soluble in water.

The product was dissolved in 25 ml. of water. A glass and calomel electrode was immersed in the solution, and the electrodes were connected to a Model G Beckman pH meter.

A ferric chloride solution prepared from 10.8 gms. of the hexahydrate salt and 25 ml. of water was placed in one burette, and 4.8 gms. of sodium hydroxide dissolved in 10 ml. of water was placed in a second burette. The ferric chloride was added dropwise to the solution until the pH dropped to 7. At this point, the sodium hydroxide was titrated into the solution until the pH rose to 8. Alternate additions of ferric chloride and sodium hydroxide were continued, the pH of the solution being maintained between 7 and 8, until all the ferric chloride had been added. The final pH was 7.3.

The deep red solution was diluted to 100 ml., and filtered through a Berkefeld filter. The filtrate contained 22 mgms. of ferric iron per milliliter, and was in a form suitable for therapeutic administration.

Twenty milliliters of the ferric chelate solution was dried in vacuo at 0.1–10 mm. Hg pressure, and at a water bath temperature of 30–5° C. A brick red residue resulted which contained 7.3 percent iron and 3.0 percent nitrogen. The iron compound was very soluble in water.

(2) *Mono-glucose-histidine iron complex.*—Eighteen grams of sodium bicarbonate was dissolved in 100 ml. of water. Histidine hydrochloride, 20.9 gms., was added carefully. Glucose, 18.0 gms., was dissolved in the solution which was allowed to stand overnight. The aqueous solution was concentrated in vacuo, 0.1–10 mm. Hg, at a water bath temperature of 30–5° C. to a white, amorphous solid.

The product was ground up to a powder and digested in 250 ml. of boiling methyl alcohol. The solution was filtered from an insoluble residue. A cream colored precipitate separated from the methyl alcohol solution on cooling. The precipitate was removed by filtration, and dried in vacuo over $P_2O_5$. Additional product was obtained by evaporation to dryness of the methyl alcohol filtrate.

The product was found to contain 10.1 percent nitrogen. Chromatographic analysis demonstrated that the glucose and histidine were chemically combined.

The glucosyl histidinate product, 35.8 gms., was dissolved in 50 ml. of water, and 10.8 gms. of ferric chloride hexahydrate was titrated into the solution, keeping the pH between 7 and 8 by additions of sodium hydroxide as described in Example 1.

A deep red solution of the ferric complex was obtained. The final pH of the solution was 7.3.

(3) *Di-glucose-histidine iron complex.*—Nine grams of sodium bicarbonate was dissolved in 100 ml. of water. Histidine hydrochloride, 10.45 gms. was added carefully to the solution. Glucose, 18.0 gms. was dissolved in the solution which was allowed to stand overnight. The aqueous solution was concentrated in vacuo, 0.1–100 mm. Hg at a water bath temperature of 30–5° C. to a white, amorphous solid.

The product was dissolved in 25 ml. of water and converted to the iron complex as described in Example 2.

(4) *The iron complex of disodium glucuronyl glycinate.*—Nine grams of sodium bicarbonate was dissolved in 100 ml. of water. To this solution was added 7.5 gms. of glycine and 23.4 gms. of sodium glucuronate monohydrate. The solution developed a light brown color which did not deepen on standing overnight.

The solution was concentrated to dryness under reduced pressure, 0.1–10 mm. Hg, and a bath temperature of 30–5° C. The drying was continued in vacuum drying oven at 30–5° C. for 24 hours.

Seven grams of the powdered product was dissolved in 100 ml. of water, and to this solution was added 50 ml.

of .09841 M ferric chloride, followed by 10 ml. of 1.0 N NaOH. A second 50 ml. of .09841 M FeCl₃ solution was added, and 11.0 ml. of 1.0 N NaOH brought the pH up to 7.05. The solution was deep red in color and contained 1 mg. or iron per milliliter.

(5) *Ferric complex of sodium fructosyl glycinate.*—Nine grams of sodium bicarbonate was dissolved in 100 ml. of water followed by 7.5 gms. of glycine and 17.0 gms. of fructose. The solution was allowed to stand overnight. It was concentrated to dryness in vacuo at a water bath temperature of 30–5° C. The dried amorphous product was ground to a granular powder. A 5.6 gm. portion of the powder was dissolved in 10 ml. of water, and 10 ml. of 1.0 M ferric chloride was added alternately with 18.1 ml. of 1.0 N sodium hydroxide, the pH being maintained between 7 and 8. A deep, red solution resulted, pH. 7.3.

(6) *Ferric complex of sodium glucosyl sarcosinate.*—Nine gms. of sodium bicarbonate was dissolved in 100 ml. of water. Sarcosine, 8.9 gms., was dissolved in the solution, and to this was added 17.0 gms. of glucose. After standing overnight, the solution was evaporated to dryness in vacuo, 0.1–15 mm. Hg, and a water bath temperature of 30–5° C. A light tan amorphous solid resulted. It was converted to the iron complex by the procedure described in Example 1.

(7) *The ferric complex of disodium-diglucosyl ethylenediamine-diacetate.*—Sodium bicarbonate, 18.0 gms. was added to 100 ml. of water. Ethylene diamine N,N′-diacetic acid, 21.0 gms. was added to the solution in small portions. When the amino acid had been added, a clear solution resulted. To this was added 34.0 gms. of glucose, and the solution was allowed to stand overnight.

The aqueous solution was filtered to remove a small amount of insoluble material, and the filtrate concentrated to a thick syrup. The solution was dissolved in 50 ml. of water, and to this solution was added 21.6 gms. of ferric chloride hexahydrate dissolved in 20 ml. of water. Sodium hydroxide solution, 5 N, was added dropwise at the same time in order to maintain the pH at 7–8. A deep red solution of the ferric complex was obtained.

(8) *The ferric complex of sodium glucosyl iminodiacetate.*—Disodium iminodiacetate, 19.5 gms. was dissolved in 100 ml. of water. To this solution was added 17.0 gms. of glucose, and the solution was allowed to stand at room temperature for 24 hours. The water was removed from the reaction product by evaporation under reduced pressure at a temperature of 30–5° C. The resulting syrup was dissolved in 50 ml. of water, and to this solution was added 10.8 gms. of ferric chloride hexahydrate dissolved in 10 ml. of water. Five normal sodium hydroxide was added simultaneously to maintain the pH between 7 and 8.

(9) *The ferric complex of disodium glucosyl glutamate.*—Sodium bicarbonate, 18.0 gms., was dissolved in 100 ml. of water. Glutamic acid, 14.7 gms., was carefully added to the solution. This was followed by 17.0 gms. of dextrose. The solution was allowed to stand 24 hours at room temperature, and then evaporated to dryness under reduced pressure. The amorphous, granular residue was converted to the iron chelate by the method detailed in Example 1.

The preparation of calcium complexes is illustrated in the examples below:

(10) *The calcium complex of glucuronyl glycinate.*—Forty-two grams of calcium glucuronate was dissolved in 100 milliliters of water, and to this solution was added 15.0 gms. of glycine. The solution was maintained at pH 8.0 by the addition of regulated amounts of 1.0 N sodium hydroxide. After 8 hours, the solution was evaporated to dryness in vacuo to yield an amorphous, cream colored solid. The calcium complex had a solubility in water exceeding 50 percent and had a calcium content of 5.1 percent.

(11) *The calcium complex of glucuronyl iminodiacetate.*—To 42 grams of calcium glucuronate, dissolved in 200 milliliters of water, was added 26 grams of iminodiacetic acid. The pH was adjusted to 8.0 with 5 N sodium hydroxide, and the solution was allowed to stand overnight. The clear solution was evaporated to dryness in vacuo, 0.1–10 mm. Hg., from a water bath at 45° C. An amorphous residue was obtained.

(12) *The calcium complex of glucosyl iminodiacetate.*—To 13 grams of iminodiacetic acid, dissolved in 250 ml. of water, was added the equivalent of 4 gms. of calcium as calcium hydroxide. To this dispersion of the calcium salt of iminodiacetic acid was added 18 gms. of glucose. After standing overnight, the solution was filtered from a small amount of insoluble material, and concentrated to dryness in vacuo (1–10 mm. Hg. at 40–5° C.). The residue was a white amorphous solid.

(13) *The calcium complex of glucosyl aspartate.*—To a dispersion of 13.7 grams of calcium aspartate in 150 ml. of water was added 18 gms. of glucose. After standing 24 hours, the solution was evaporated to dryness in vacuo. The residue was redispersed in 150 ml. of water, filtered, and the solution concentrated to dryness in vacuo at 35–40° C. An almost white amorphous residue was obtained.

The physiological utility of the iron chelates was first investigated in connection with rats suffering from nutritional anemia due to iron deficient diets, after toxicity studies indicated that 5 to 10 mg. of the chelated iron could be injected intraperitoneally into 100–150 gm. rats without any toxic symptoms. This is regarded as an extremely massive dose. Similar results were obtained on rabbits. No toxic effects were observed.

Rats lend themselves to such investigation because the hemoglobin synthesis mechanism in rats is similar to that in humans except for the specific protein portion of the hemoglobin. The same is true of other mammals such as cattle, horses and the like.

Tests were carried out on weanling rats maintained on a milk diet. The nutritional anemia in these rats responded readily to iron therapy as evidenced by hemoglobin regeneration. Blood hemoglobin determinations were made at intervals on tail vein blood by a direct spectrophotometric method.

In the first tests, three groups of four rats each were used. In the first group, each rat received an intravenous injection of 1 mg. of iron chelated with the glucose-glycine product; the second group received the same by intraperitoneal injection; while the third group received 2.5 mg. of ferrous sulfate in their milk. The results are listed in Table 1. The effects of multiple injections of the iron chelates of the glucose-glycine and the glucuronate-glycine products are listed in Table 2.

TABLE 1

Blood hemoglobin levels of anemic rats treated with a single injection of the ferric chelate of glucosylglycine

| Group | Form of iron | Hemoglobin levels (g./100 ml.) | | | |
|---|---|---|---|---|---|
| | | Initial | 5 day | 16 days | 31 days |
| 1 | 0.5 ml sodium ferric glucosylglycine (1.0 mg. Fe) i.v. injection | 3.44 | 4.36 | 8.21 | 8.70 |
| | | 3.87 | 5.71 | 7.59 | 11.37 |
| | | 3.55 | 5.84 | 8.21 | 10.15 |
| | | 3.15 | 4.51 | 7.87 | 11.37 |
| | Average | 3.50 | 5.10 | 7.97 | 10.39 |
| 2 | 0.5 ml sodium ferric glucosylglycine (1.0 mg. Fe) i.p. injection | 3.15 | 3.40 | 8.40 | 12.76 |
| | | 2.06 | 2.45 | 4.59 | 8.21 |
| | | 2.26 | 2.50 | 6.68 | 11.37 |
| | | 3.35 | 2.94 | 5.91 | 9.80 |
| | Average | 2.70 | 2.82 | 6.39 | 10.53 |
| 3 | 2.5 mg. FeSO₄ orally | 2.64 | (¹) | (¹) | (¹) |
| | | 2.45 | 6.57 | 5.65 | 3.71 |
| | | 2.94 | 8.21 | (¹) | (¹) |
| | | 3.55 | 7.00 | 6.76 | 4.51 |
| | Average | 2.89 | | | |

¹ Dead.

TABLE 2

*Blood hemoglobin levels of anemic rats treated with multiple injections of chelated iron*

| Group | Form of iron | Hemoglobin level (g./100 ml.) | | |
|---|---|---|---|---|
| | | Initial | 14 days | 32 days |
| 1 | Sodium ferric glucosylglycine (1.0 mg. Fe/0.5 ml.) i.p. injection 0.5 ml. at 0, 3, 10 and 28 days | 9.47<br>5.54<br>9.47<br>5.53<br>8.21<br>6.26<br>6.01 | 11.55<br>9.06<br>11.71<br>7.94<br>9.22<br>11.21<br>8.36 | 12.06<br>11.83<br>12.41<br>8.09<br>11.55<br>(¹)<br>12.41 |
| 2 | Sodium ferric glucuronyl glycine (1.0 mg. Fe/0.5 ml.) i.p. injection 0.5 ml. at 0, 3, 10 and 28 days | 8.63<br>8.09<br>8.91<br>6.13<br>5.95 | 13.03<br>11.37<br>13.30<br>13.03<br>12.41 | 13.89<br>14.03<br>14.28<br>18+<br>13.09 |
| 3 | Sodium ferric ethylenediamine bis (o-hydroxyphenylacetate) (1.0 mg. Fe/ml.) i.p. injection 1.0 ml. at 0, 3, 10, and 28 days | 8.63<br>5.48<br>7.80<br>6.01<br>4.64<br>5.54<br>6.13 | 11.98<br>8.01<br>11.21<br>8.09<br>7.28<br>6.87<br>7.55 | (¹)<br>(¹)<br>(¹)<br>8.09<br>8.36<br>------<br>6.94 |

¹ Dead.

The results of these tests indicate that the iron chelates of the sugar-amino acid products are effective in regenerating hemoglobin in anemic rats when administered parenterally. To compare these compounds with saccharated iron oxide and sodium ferric EDTA, the data of Seeberg, Hidalgo, and Wilkin (Science 119, 608 (1954)) are reproduced in Table 3.

TABLE 3

*Blood hemoglobin levels of anemic rats treated intravenously with saccharated iron oxide and chelated iron*

| Number of animals | Form of iron | Average blood hemoglobin (g./100 ml.) | | | | |
|---|---|---|---|---|---|---|
| | | Initial | 7 days | 14 days | 19 days | 28 days |
| 4 | Saccharated iron oxide, 4 mg. Fe/kg., twice weekly | 3.5 | 5.1 | 8.3 | 11.6 | 12.0 |
| 4 | Sodium ferric EDTA, 4 mg. Fe/kg., twice weekly | 3.5 | 4.2 | 4.6 | 5.4 | 5.2 |

Although the experimental data detailed in Table 3 is not strictly comparable to the previously described studies, it can be concluded that the parenteral administration of ferric chelates of glucose-glycine and glucuronate-glycine appear to be markedly effective in regenerating hemoglobin in anemic rats. This is in marked contrast to the ferric chelate of EDTA which was relatively ineffective when administered intravenously. The ferric chelate of ethylenediamine bis(o-hydroxyphenylacetic acid), which has been used for correcting iron chlorosis in agricultural crops, was not as good as the hexose-glycine ferric chelates in promoting hemoglobin synthesis.

Chelating agents derived from sugars and amino acids and used for nutritional and other therapeutic purposes are less toxic than the synthetic chelating agents of the ethylene diamine tetracetic acid type. Furthermore, studies on the intravenous administration of the ferric chelate of glucose-glycine to normal humans and rats indicate that a large percentage of the injected iron is excreted in the urine, whereas in anemic humans and rats the iron excretion appears to be about 10 percent of the injected dose, indicating a correlation between urinary excretion of the chelated iron and the iron status of the body.

Our novel iron chelates have been administered to humans with beneficial effects and no adverse symptoms.

In contrast with other parenteral iron compounds, the chelates of this invention can be administered without painful side reactions, they do not build up in the system, they do not stain and they may be used intravenously as well as intramuscularly and orally.

Similar advantages over prior compounds are exhibited by the calcium complexes of this invention, for special nutritional effect in calcium deficient states.

The new compounds of the present invention may be prepared as salts, preferably the sodium, potassium, or ammonium salts.

We claim:

1. An alkali metal salt of the complex of a metal selected from the group consisting of iron and calcium formed by the addition of a salt of such metal, in which the anion of said salt is selected from the group consisting of organic and inorganic radicals, to the reaction product of a compound selected from the group consisting of naturally occurring amino acids and N-mono-substituted glycine wherein the nitrogen substituent is selected from the group consisting of carboxymethyl, alkyl having from 1 to 6 carbon atoms, hydroxyalkyl having from 1 to 6 carbon atoms, hydroxycyclohexyl and hydroxyphenyl with an aldehyde compound selected from the group consisting of mono-saccharides and hexuronic acid, said reaction taking place in a pH range of about 5–9 and at a temperature of about 15–60° C.

2. An alkali metal salt of an iron complex formed by the addition of an iron salt in which the anion of said salt is selected from the group consisting of organic and inorganic radicals, to the reaction product of a mono-saccharide and an amino acid selected from the group consisting of naturally occurring amino acids and N-mono-substituted glycine wherein the nitrogen substituent is selected from the group consisting of carboxymethyl, alkyl having from 1 to 6 carbon atoms, hydroxyalkyl having from 1 to 6 carbon atoms, hydroxycyclohexyl and hydroxyphenyl, said reaction taking place in a pH range of about 5–9 and at a temperature of about 15–60° C.

3. An alkali metal salt of the iron complex formed by the addition of an iron salt, in which the anion of said salt is selected from the group consisting of organic and inorganic radicals, to the reaction product of hexuronic acid with an amino acid selected from the group consisting of naturally occurring amino acids and N-mono-substituted glycine wherein the nitrogen substituent is selected from the group consisting of carboxy-methyl, alkyl having 1 to 6 carbon atoms, hydroxycyclohexyl hydroxyalkyl having from 1 to 6 carbon atoms, and hydroxyphenyl, said reaction taking place in a pH range of about 5–9 and at a temperature of bout 15–60° C.

4. The iron complex of the reaction product of a mono-saccharide and an amino acid selected from the group consisting of naturally occurring amino acids and N-mono-substituted glycine wherein the nitrogen substituent is selected from the group consisting of carboxymethyl, alkyl having from 1 to 6 carbon atoms, hydroxyalkyl having from 1 to 6 carbon atoms, hydroxycyclohexyl and hydroxyphenyl, said reaction taking place in a pH range of about 5–9 and at a temperature of about 15–60° C.

5. The iron complex of the reaction product of hexuronic acid and an amino acid selected from the group consisting of naturally occurring amino acids and N-mono-substituted glycine wherein the nitrogen substituent is selected from the group consisting of carboxymethyl, alkyl having from 1 to 6 carbon atoms, hydroxyalkyl having from 1 to 6 carbon atoms, hydroxycyclohexyl and hydroxyphenyl, said reaction taking place in a pH range of about 5–9 and at a temperature of about 15–60° C.

6. The calcium complex of the reaction product of a mono-saccharide and an amino acid selected from the group consisting of naturally occurring amino acids and N-mono-substituted glycine wherein the nitrogen substituent is selected from the group consisting of carboxymethyl, alkyl having from 1 to 6 carbon atoms, hydroxalkyl having from 1 to 6 carbon atoms, hydroxycyclohexyl and hydroxyphenyl, said reaction taking place in a pH range of about 5–9 and at a temperature of about 15–60° C.

7. The calcium complex of the reaction product of hexuronic acid and an amino acid selected from the group consisting of naturally occurring amino acids and N-mono-substituted glycine wherein the nitrogen substituent is selected from the group consisting of carboxymethyl, alkyl having from 1 to 6 carbon atoms, hydroxyalkyl having from 1 to 6 carbon atoms, hydroxycyclohexyl and hydroxyphenyl, said reaction taking place in a pH range of about 5–9 and at a temperature of about 15–60° C.

8. A process of preparing a therapeutic composition which comprises forming the sodium salt of an iron complex of the reaction product of a mono-saccharide and an amino acid selected from the group consisting of naturally occurring amino acids and N-mono-substituted glycine wherein the nitrogen substituent is selected from the group consisting of carboxymethyl, alkyl having from 1 to 6 carbon atoms, hydroxyalkyl having from 1 to 6 carbon atoms, hydroxycyclohexyl and hydroxyphenyl, said reaction taking place in a pH range of about 5–9 and at a temperature of about 15–60° C.

9. A process of preparing a therapeutic composition which comprises forming the sodium salt of an iron complex of the reaction product of hexuronic acid and an amino acid selected from the group consisting of naturally occurring amino acids and N-mono-substituted glycine wherein the nitrogen substituent is selected from the group consisting of carboxymethyl, alkyl having from 1 to 6 carbon atoms, hydroxyalkyl having from 1 to 6 carbon atoms, hydroxycyclohexyl and hydroxyphenyl, said reaction taking place in a pH range of about 5–9 and at a temperature of about 15–60° C.

10. A process of preparing a therapeutic composition which comprises forming the calcium complex of the reaction product of a mono-saccharide and an amino acid selected from the group consisting of naturally occurring amino acids and N-mono-substituted glycine wherein the nitrogen substituent is selected from the group consisting of carboxymethyl, alkyl having from 1 to 6 carbon atoms, hydroxyalkyl having from 1 to 6 carbon atoms, hydroxycyclohexyl and hydroxyphenyl, said reaction taking place in a pH range of about 5–9 and at a temperature of about 15–60° C.

11. A process of preparing a therapeutic composition which comprises forming the calcium complex of the reaction product of hexuronic acid and an amino acid selected from the group consisting of naturally occurring amino acids and N-mono-substituted glycine wherein the nitrogen substituent is selected from the group consisting of carboxymethyl, alkyl having from 1 to 6 carbon atoms, hydroxyalkyl having from 1 to 6 carbon atoms, hydroxycyclohexyl and hydroxyphenyl, said reaction taking place in a pH range of about 5–9 and at a temperature of about 15–60° C.

12. The sodium salt of the iron complex of the reaction product of glucose and glycine said reaction taking place in a pH range of about 5–9 and at a temperature of about 15–60° C.

13. The sodium salt of the iron complex of the reaction product of glucose and histidine said reaction taking place in a pH range of about 5–9 and at a temperature of about 15–60° C.

14. The sodium salt of the iron complex of the reaction product of glucose and glutamic acid said reaction taking place in a pH range of about 5–9 and at a temperature of about 15–60° C.

15. The sodium salt of the iron complex of the reaction product of glucose and iminodiacetic acid said reaction taking place in a pH range of about 5–9 and at a temperature of about 15–60° C.

16. The sodium salt of the iron complex of the reaction product of glucose and ethylenediaminediacetic acid said reaction taking place in a pH range of about 5–9 and at a temperature of about 15–60° C.

17. The sodium salt of the iron complex of the reaction product of sodium glucuronate and glycine said reaction taking place in a pH range of about 5–9 and a temperature of about 15–60° C.

18. The sodium salt of the iron complex of the reaction product of sodium glucuronate and disodium iminodiacetate said reaction taking place in a pH range of about 5–9 and at a temperature of about 15–60° C.

19. The calcium complex of the reaction product of glucose and disodium iminodiacetate said reaction taking place in a pH range of about 5–9 and at a temperature of about 15–60° C.

20. The calcium complex of the reaction product of glucose and aspartic acid said reaction taking place in a pH range of about 5–9 and at a temperature of about 15–60° C.

21. The calcium complex of the reaction product of calcium glucuronate and disodium iminodiacetate said reaction taking place in a pH range of about 5–9 and at a temperature of about 15–60° C.

22. The calcium complex of the reaction product of calcium glucuronate and disodium aspartate said reaction taking place in a pH range of about 5–9 and at a temperature of about 15–60° C.

23. The calcium complex of the reaction product of calcium glucuronate and glycine said reaction taking place in a pH range of about 5–9 and at a temperature of about 15–60° C.

References Cited in the file of this patent
UNITED STATES PATENTS
2,868,724   Zech _____ Jan. 13, 1959

OTHER REFERENCES

Pigman: Carbohydrates, pages 420–422, Academic Press Inc., N.Y.C., 1948.